June 2, 1959  M. J. STUMBOCK  2,888,742
COMPOUND METAL MEMBER
Filed Aug. 15, 1955
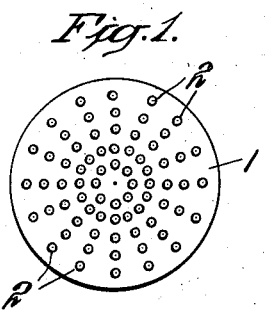
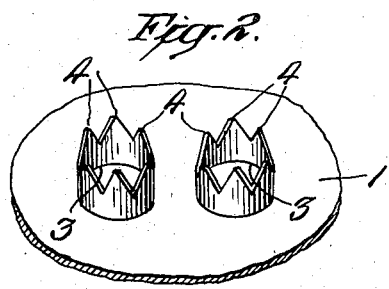
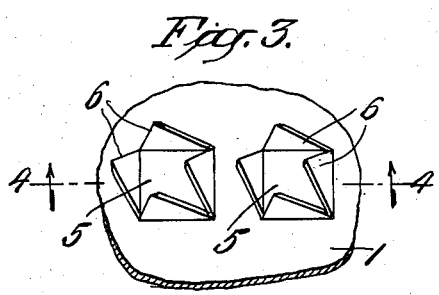
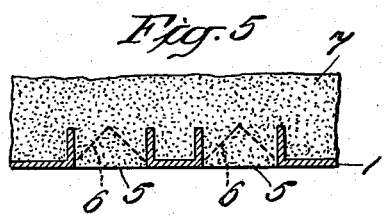
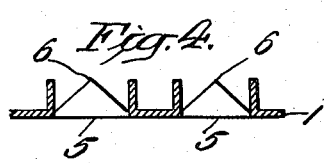
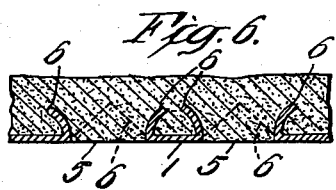
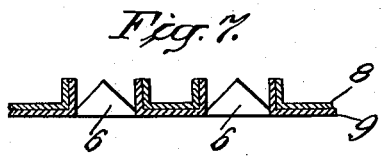
INVENTOR.
MAX J. STUMBOCK
BY
ATTORNEY United States Patent Office 2,888,742
Patented June 2, 1959

2,888,742
COMPOUND METAL MEMBER

Max J. Stumbock, South Orange, N.J., assignor to Engelhard Industries, Inc., a corporation of New Jersey Application August 15, 1955, Serial No. 528,436

1 Claim. (Cl. 29—195)

The present invention deals with a compound metal member and, more particularly, with a compound metal stock, disc, or the like structure, especially useful for the manufacture of electrical contacts.

In the manufacture of electrical contact assemblies, the electrical contact elements such as tips, discs, bars, etc., have to be attached to electrically conductive contact brackets, arms, screws, and the like supports. This operation involves either soldering, brazing or resistance welding. In soldering, a solder, e.g. silver solder, is placed between the contact element and the metal support and the assembly is heated by torch, induction, etc., until the solder fuses and thereby provides the desired bond. In resistance welding the assembly is placed between two electrodes and a powerful current pulse of very short duration is sent through the contact and the support. Due to the surface resistance of the joint between the contact element and the support, this joint is momentarily heated by the current to incipient fusion of one or both metals, and in alloying one part with the other provides the desired bond. This operation may be performed with or without silver solder in the joint, but a high resistance metal at the joint is helpful. If the contact elements are made from melted and formed metals and alloys, such operations are simple and are in general use. However, numerous contact materials are pressed from metal powders, e.g. silver powders, and usually contain admixtures of oxides, e.g. tin oxide, or graphite, or very refractory and readily oxidizable metals such as tungsten and molybdenum. These constitutents are beneficial in preventing the sticking of the contacts in operation, but they also make the soldering or welding of the contact elements to a metal support very difficult, even when fluxes are used to reduce or dissolve such oxides. Therefore, in order to provide such a pressed and sintered contact element with a suitable backing of solder or resistance metal, various methods have been proposed to facilitate the joining of the parts. These methods include partially dissolving or reducing the oxides, electroplating, etc. However, all such methods are either not practical or reliable production methods or they interfere with the electrical functioning of the contact materials, the oxide content of which is an essential part required for optimum contact performance.

It is an object of the present invention to provide a method and means by which a refractory powdered metal component is easily and economically bonded with another metal component to form a compound metal member. It is another object of the present invention to provide a method and means for bonding a layer of powdered metal to a layer of solid metal without deleteriously affecting the powdered metal layer. Other objects and advantages of the invention will become apparent from the description hereinafter following and the drawings forming a part hereof, in which:

Figure 1 illustrates a top view of a metal disc having a plurality of protruded openings therein, Figure 2 is an enlarged fragmentary view of Figure 1 illustrating a plurality of the protruded openings, Figure 3 is an enlarged fragmentary view illustrating a non-circular form of protruded openings, Figure 4 is a partly cross-sectional and partly elevational view along lines 4—4 of Figure 3, Figure 5 is a cross-sectional view showing the structure of Figure 4 with a layer of powdered metal thereon, Figure 6 illustrates a cross-sectional view of a compressed compound metal according to this invention, Figure 7 illustrates a modification of Figure 4, and Figure 8 illustrates a cross-sectional view of an electrical contact member according to this invention.

The invention deals with a compound metal member comprising a layer of powdered metal and a backing layer of solid metal, said solid metal layer having a plurality of protruded openings formed therethrough whereby the displaced protruded metal is imbedded in the layer of powdered metal by compression or compression and sintering and acts to anchor the solid metal to the powdered metal to provide a mechanical bond therebetween which bond may be further supplemented or strengthened by sintering the composite member, and a second metal backing bonded to said protruded layer.

Figures 1 and 2 illustrate a disc 1 of solid metal or metal alloy, preferably a disc of solder, having a plurality of protruded or pertused openings 2 formed therethrough. While the solid metal is illustrated as a disc 1, it is apparent that the solid metal may be in the form of a sheet or strip of metal. For example, the solid metal 1 may be a silver solder composed of Ag 60%–Cu 40%; Ag 60%–Cu 33%–Zn 7% or Ag 60%–Cu 33%–Zn 4%–P 3%. I prefer to employ the last mentioned silver solder composition because of the beneficial effects of the small phosphorus content which enhances the adherence of the solder disc, strip or the like to a refractory powdered metal layer.

Figure 2 illustrates one form of protruded opening herein contemplated, which is characterized by a substantially circular opening 3 in one side of the metal and with the protruded metal 4 being displaced outwardly of the other side of the metal projecting out of the plane of the metal about the periphery of the opening. Figure 3 illustrates another form of protruded opening 5 of non-circular configuration and having a plurality of projections 6 projecting out of the plane of the metal about the periphery of the opening. Figure 4 illustrates a cross-sectional view of Figure 3 and Figure 5 shows a layer of powdered metal 7 applied to the protruded surface of the disc or strip 1. Each time a metal powder compact is to be pressed, a protruded solder disc, or strip, etc., is placed, for example, in a die with the protrusions 6 on the upper side, a layer of powder 7 is placed on the protruded surface, and the composite or compound structure is pressed or compacted. On pressing and compacting the powdered metal 7, the protrusions 6 are partly distorted and bent outwardly and backwardly and are caused to grip the compacted metal powder substantially as illustrated by Figure 6. The bending of the protrusions 6 grips the powdered compact, whereby a mechanical bond is afforded by the distorted or bent protrusions. This desirable effect may be further enhanced by the subsequent sintering of the pressed compact. It is obvious that this powdered metal–solid metal combination can be employed to provide any form of structure made from metal powder with a metal backing of solid metal such as copper, nickel, steel, silver, etc., as well as backings of solder hereinabove described. The backings are not limited to a single layer of backing metal, since they may also consist of two or more layers with a solder layer 8 as the inner layer and another metal layer 9 comprising the outer layer, as illustrated by Figure 7, or the outer layer may be a solder layer with the inner layer being of another metal, or the backing may be a laminated structure with a metal layer between two layers of solder.

Having provided a composite metal member, e.g. such as illustrated by Figure 6, a second backing member, preferably in the form of an arm or support 10 according to Figure 8, is bonded to the metal layer 1, said arm or support 10 being easily bonded to said layer 1, whereas without the intermediate layer 1 the arm of support 10 cannot be so easily bonded to an oxide-containing sintered contact body without deleteriously affecting the oxide containing sintered contact body.

What I claim is:

An electrical contact comprising a contact body of the type composed of compacted and sintered silver powder with a refractory oxide distributed therethrough, in combination with a silver solder metal backing layer bonded to said body, the backing layer having a plurality of protruded openings therethrough with the metal displaced by protrusion projecting outwardly of one side only of the backing into and imbedded in said contact body, and a metal contact support member bonded to the contact body with the solder bonding layer therebetween.

References Cited in the file of this patent

UNITED STATES PATENTS

| | | |
|---|---|---|
| 1,456,599 | Jensen | May 29, 1923 |
| 2,052,585 | Tannewitz | Sept. 1, 1936 |
| 2,147,447 | Kolligs | Feb. 14, 1939 |
| 2,178,527 | Wellman | Oct. 31, 1939 |
| 2,255,120 | Kiefer | Sept. 9, 1941 |
| 2,381,941 | Wellman | Aug. 14, 1945 |
| 2,444,914 | Brennan | July 13, 1948 |
| 2,464,437 | Dasher | Mar. 15, 1949 |
| 2,652,624 | Guinee | Sept. 22, 1953 |